United States Patent
Linnewiel

(10) Patent No.: US 9,353,954 B2
(45) Date of Patent: May 31, 2016

(54) APPARATUS FOR PREPARING FOOD

(75) Inventor: Remco Linnewiel, Assen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 187 days.

(21) Appl. No.: 14/117,900

(22) PCT Filed: Jun. 7, 2012

(86) PCT No.: PCT/IB2012/052881
§ 371 (c)(1),
(2), (4) Date: Nov. 15, 2013

(87) PCT Pub. No.: WO2012/168897
PCT Pub. Date: Dec. 13, 2012

(65) Prior Publication Data
US 2014/0083992 A1    Mar. 27, 2014

(30) Foreign Application Priority Data
Jun. 7, 2011  (EP) .................................. 11168899

(51) Int. Cl.
| F24C 15/32 | (2006.01) |
| A21B 3/04 | (2006.01) |
| F24C 7/04 | (2006.01) |
| A47J 37/06 | (2006.01) |
| A47J 39/00 | (2006.01) |

(Continued)

(52) U.S. Cl.
CPC . *F24C 7/043* (2013.01); *A21B 3/04* (2013.01); *A47J 37/0641* (2013.01); *A47J 39/003* (2013.01); *F24C 7/04* (2013.01); *F24C 15/2007* (2013.01); *F24C 15/325* (2013.01); *A21B 1/26* (2013.01)

(58) Field of Classification Search
None
See application file for complete search history.

(56) References Cited

U.S. PATENT DOCUMENTS

| 3,656,469 A * | 4/1972 | Jung ........................ A21B 1/26 |
| | | 126/21 A |
| 4,598,691 A * | 7/1986 | Herrelko ............. F24C 15/2007 |
| | | 126/19 R |
| 4,909,236 A * | 3/1990 | Del Fabbro ............... F28D 7/06 |
| | | 126/21 A |

(Continued)

FOREIGN PATENT DOCUMENTS

| CN | 203088793 U | 7/2013 |
| EP | 0284420 A1 | 9/1988 |

(Continued)

*Primary Examiner* — Joseph M Pelham

(57) ABSTRACT

The application relates to an apparatus for preparing food. The apparatus includes a housing (1), a food preparation chamber (4) in the housing (1) having an inner wall (5) defining a food receiving space (6) with an air entry aperture (10) and an air discharge aperture (13), a fan (14) for moving a flow of hot air successively through the air entry aperture (10), the food receiving space (6) and the air discharge aperture (13), and an air guide passage (7) for returning the flow of air from the air discharge aperture (13) towards the air entry aperture (10) separate from the food receiving space (6). The housing (1) comprising a cooling air channel (30) and a hot air vent (20) for exhausting the flow of hot air from the food preparation chamber (4) to outside the housing (1) with a constricted section (29) having a reduced cross-sectional area such that a venturi effect is generated in the hot air vent (20). An outlet (35) to the cooling air channel (30) communicates with the hot air vent (20) at the constricted section (29) such that a region of low pressure is formed at the outlet (35) and a flow of cooling air is drawn along the cooling air channel (30) and into the hot air vent (20).

14 Claims, 3 Drawing Sheets

(51) Int. Cl.
*F24C 15/20* (2006.01)
*A21B 1/26* (2006.01)

(56) References Cited

U.S. PATENT DOCUMENTS

| | | | | |
|---|---|---|---|---|
| 5,140,120 A * | 8/1992 | Kasai | ............... | H05B 6/6411 |
| | | | | 126/21 A |
| 7,468,496 B2 * | 12/2008 | Marchand | ........... | F24C 15/2007 |
| | | | | 126/21 A |
| 7,964,823 B2 * | 6/2011 | Armstrong | ............ | F24C 15/006 |
| | | | | 126/198 |
| 2002/0036195 A1 | 3/2002 | Loveless | | |
| 2008/0110879 A1 * | 5/2008 | Marchand | ........... | F24C 15/2007 |
| | | | | 219/757 |
| 2009/0107479 A1 * | 4/2009 | Armstrong | ............ | F24C 15/006 |
| | | | | 126/21 A |
| 2014/0020670 A1 * | 1/2014 | Lee | ....................... | F24C 15/322 |
| | | | | 126/21 A |

FOREIGN PATENT DOCUMENTS

| | | |
|---|---|---|
| EP | 1867264 A1 | 12/2007 |
| EP | 2034872 B1 | 4/2010 |
| GB | 1512075 A | 5/1978 |
| JP | 05317164 A | 12/1993 |
| JP | 2000350663 A | 12/2000 |
| JP | 2004267282 A | 9/2004 |
| JP | 200989993 A | 4/2009 |
| JP | 200106167 A | 3/2011 |
| JP | 2001061673 A | 3/2011 |

* cited by examiner

_____

APPARATUS FOR PREPARING FOOD

CROSS-REFERENCE TO PRIOR APPLICATIONS

This application is the U.S. National Phase application under 35 U.S.C. §371 of International Application No. PCT/IB2012/052881, filed on Jun. 7, 2012, which claims the benefit of European Patent Application No. 11168899.0, filed on Jun. 7, 2011. These applications are hereby incorporated by reference herein.

FIELD OF THE INVENTION

The present invention relates to an apparatus for preparing food. In particular, the present invention relates to an apparatus for preparing food by moving a flow of hot air over items of food to heat them.

BACKGROUND OF THE INVENTION

An apparatus for preparing food is known from EP 2 034 872 B1. The apparatus is generally used in a domestic setting and provides a means of preparing food for eating by circulating a flow of hot air around the food items to heat and/or cook the food. Such an apparatus generally comprises a housing with an enclosed food preparation chamber, into which food items are placed and a flow of hot air is then circulated around the food preparation chamber to heat the food by a fan which is driven by a motor.

During the heating process steam is generated from water contained in the food, which causes the pressure in the food preparation chamber to increase. Furthermore, other liquids such as oil are also discharged from the food. Therefore, a hot air vent is provided through the housing so that the air, steam and oil under increased pressure in the food preparation chamber is expelled through the hot air vent from the food preparation chamber to outside the apparatus.

However, a disadvantage of a conventional apparatus for preparing food is that the hot air in the food preparation chamber is known to heat up the housing of the apparatus. This may cause injuries or discomfort when a user comes into contact with the housing. Furthermore, it is also necessary to cool internal components, such as a motor to drive the fan, to prevent the components from overheating and having reliability problems.

One attempt to overcome the above problems is to provide a cooling air channel in the housing and a cooling air fan to urge cool air to flow in the housing to force excessive heat out of the apparatus to prevent overheating of the outer surface of the housing and internal components. Such a cooling air channel generally has an inlet at the upper end of the housing and an outlet in the lower end of the housing so that cooling air is urged to flow through the inlet, along the cooling air channel and from the outlet.

However, a problem with the provision of a cooling air fan and channel is that additional components are needed which increases the cost of the apparatus and reduces its reliability. Furthermore, the fan increases the noise of the apparatus during use.

SUMMARY OF THE INVENTION

Therefore, it is an object of the invention to provide an apparatus for preparing food which substantially alleviates or overcomes the problems mentioned above.

According to the present invention, there is provided an apparatus for preparing food comprising a housing, a food preparation chamber in the housing having an inner wall defining a food receiving space with an air entry aperture and an air discharge aperture, a fan for moving a flow of hot air successively through the air entry aperture, the food receiving space and the air discharge aperture, and an air guide passage for returning the flow of air from the air discharge aperture towards the air entry aperture separate from the food receiving space, the housing comprising a cooling air channel and a hot air vent for exhausting the flow of hot air from the food preparation chamber to outside the housing with a constricted section having a reduced cross-sectional area such that a venturi effect is generated in the hot air vent, wherein an outlet to the cooling air channel communicates with the hot air vent at the constricted section such that a region of low pressure is formed at the outlet and a flow of cooling air is drawn along the cooling air channel and into the hot air vent.

Advantageously, the hot air vent comprises an opening to the food preparation chamber, and the cross-sectional area of the hot air vent reduces from the opening to the constricted section.

Conveniently, the hot air vent comprises an exit on an opposing side of the constricted section to the opening which communicates with outside the housing.

The cross-sectional area of the hot air vent may increase from the constricted section to the exit.

In one embodiment, the hot air vent comprises a wall which converges inwardly into the hot air vent to form the constricted section.

In another embodiment, the wall converges towards an opposing wall to form the constricted section.

Conveniently, the wall and the opposing wall converge towards each other to form the constricted section.

Advantageously, the wall is an upper or lower wall, and the opposing wall is the opposing upper or lower wall.

In another embodiment, the wall is arcuate and at least a section of the wall converges towards a diametrically opposite section of the wall.

The cooling air channel may comprise an inlet spaced from the outlet which communicates with outside the housing so that cooling air is drawn into the cooling air channel when cooling air is drawn along the cooling air channel and into the hot air vent.

The inlet may be formed in a base of the housing.

The apparatus may further comprise a component chamber, wherein the cooling air channel fluidly communicates with the component chamber so that cooling air is drawn through the component chamber.

Advantageously, the hot air exit comprises a plurality of hot air channels communicating between the food preparation chamber and outside the housing, wherein each channel comprises a constricted section.

The apparatus may comprise a plurality of cooling air channels.

A part of the food preparation chamber may be removable from a front side of the apparatus so that food items are removable from the food receiving space, and the hot air vent may be formed in a rear side of the apparatus opposite the front side.

In view of the forgoing, cooling air may be drawn through the cooling air channel and exhausted from the housing without the need for an additional fan or other components to create a flow. Therefore, the reliability of the cooling system is improved over conventional apparatus due to the absence of moving parts or components in the cooling system.

In addition, the level of noise generated by the apparatus is minimized.

Furthermore, air flowing through the component chamber may carry heat away from the components disposed therein and so the reliability of the components will be increased.

The combined air flow exhausted from the exit of the hot air vent will be at a lower temperature than that of the hot air and other fluids expelled from the food preparation chamber only, and so the likelihood of injury or damage being caused by the fluid exhausted through the hot air vent is minimized. In addition, the velocity of the combined air flowing from the housing is minimized.

An advantage of the vent and fan being positioned in the upper part of the food preparation chamber is that liquid discharged from the food items is prevented from collecting on the fan and being discharged through the vent.

BRIEF DESCRIPTION OF THE DRAWINGS

Preferred embodiments of the invention will now be described, by way of example only, with reference to the accompanying drawing, in which.

DETAILED DESCRIPTION OF THE EMBODIMENTS

Figure 1:
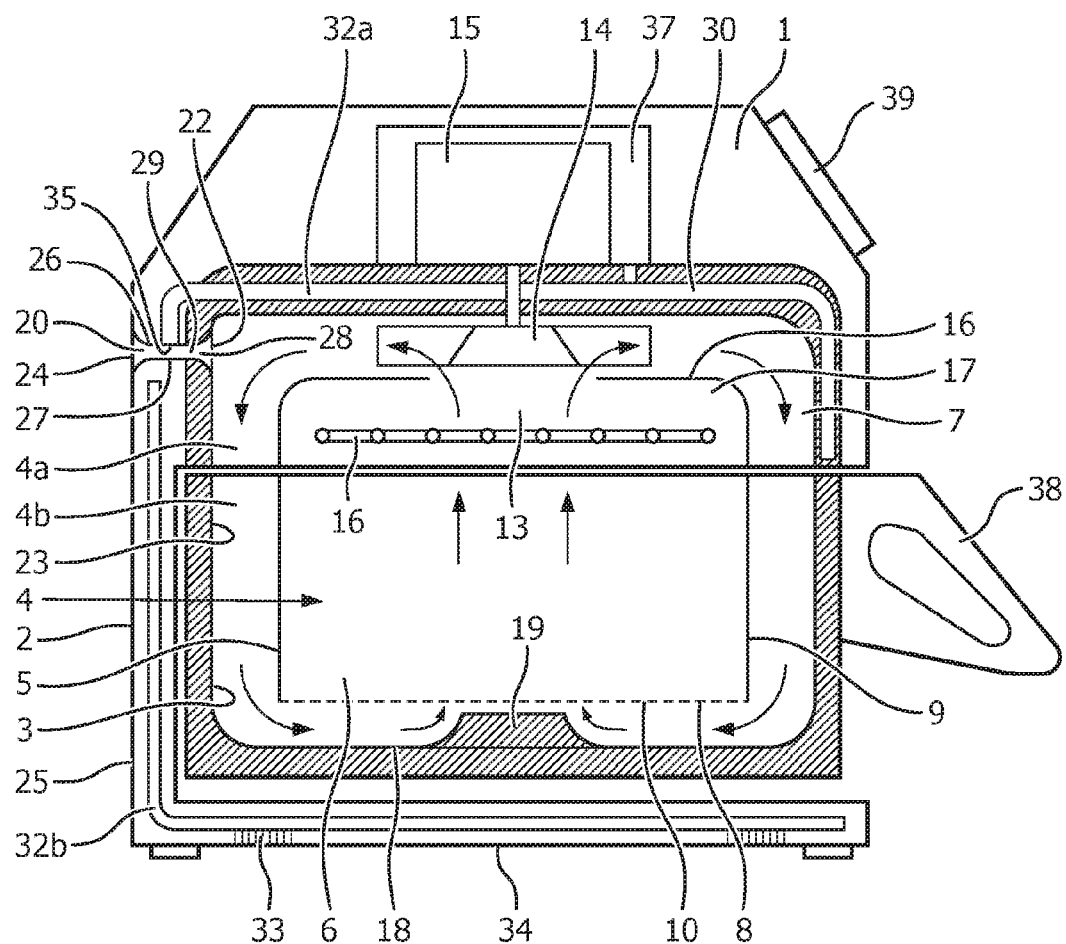
FIG. 1 shows a schematic cross-sectional view of an apparatus for preparing food.
Figure 2:
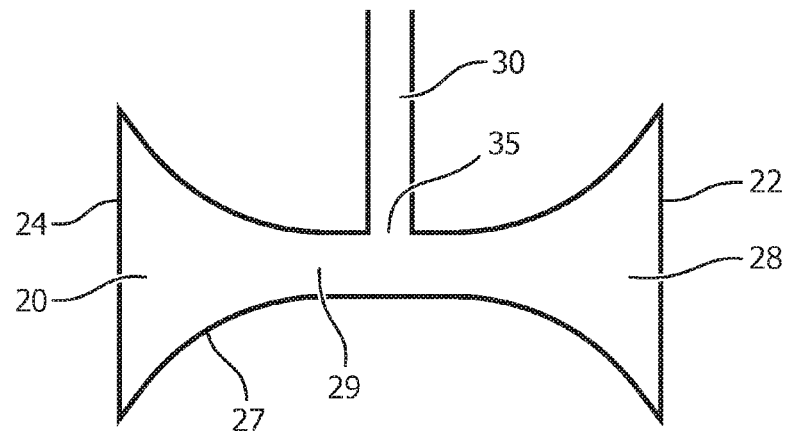
FIG. 2 shows an exploded view of a cross-sectional view of a hot air vent shown in FIG. 1.

An apparatus for preparing food is shown in FIG. 1 comprising a housing 1 and a food preparation chamber 4 formed in the housing 1. The apparatus is configured to prepare food items placed therein by heating, so as to heat and/or cook the food items ready for consumption.

The housing 1 has an outer surface 2 and an inner surface 3 which defines a wall of the food preparation chamber 4. An inner wall 5 is disposed in the food preparation chamber 4 and defines a food receiving space 6 in which food items to be heated and/or cooked (not shown) are received. The inner surface 3 of the housing 1 and the inner wall 5 extend substantially parallel to but spaced from each other to define an air guide passage 7 there between along which hot air is circulated in the food preparation chamber 4, as will be explained hereinafter.

The inner wall 5 comprises a bottom part 8 and a side wall 9 which extends around and upstands from the bottom part 8. The bottom part 8 of the inner wall 5 is provided with an air-permeable section 10 which acts as a hot air entry aperture to the food receiving space 6 and a top part 12 of the inner wall 5 is provided with a hot air discharge aperture 13 to allow air to flow there through into the air guide passage 7. In the present embodiment, the air-permeable section 10 extends across the whole bottom part 8, although it may extend across only part of the bottom part 8. The air-permeable section 10 is formed by known means, such as a mesh or grid arrangement.

A fan 14 is disposed in the food preparation chamber 4, above the discharge aperture 13 of the inner wall 5. The fan 14 is coupled to an electric motor 15 acting as a drive means to rotate the fan 14. The fan 14 is operable to move a flow of hot air by sucking air through the discharge aperture 13 by means of a low pressure generated on one side of the fan 14 and expelling a high pressure flow of air into the air guide passage 7 defined between the inner surface 3 of the housing 1 and the inner wall 5. Therefore, air expelled from the fan 14 flows along the air guide passage 7 acting as an air guide means to the air permeable section 10 of the inner wall 5. The air then flows through the air permeable section 10, into the food receiving space 6.

A heater 16 acting as a heat radiating means is disposed in an upper part 17 of the food preparation chamber 4. In this embodiment, the heater 16 is disposed in an upper portion of the food receiving space 6 below the discharge aperture 13, although it will be appreciated that the heater 16 may be disposed above the inner wall 5. The heater 16 is disposed to heat air flowing through the upper portion of the food receiving space 6. Furthermore, the heater 17 is positioned in the food receiving space 6 to radiate heat into the heat receiving space 6 and towards any food items disposed therein.

Air flowing in the air guide passage 7 between the bottom part 8 of the inner wall 5 and a base 18 of the housing inner surface 3, is directed to flow upwardly through the air-permeable section 10 of the inner wall 5 by means of an air deflector 19 which sits on the base 18 of the housing inner surface 3 and directs the flow of air upwardly.

A hot air vent 20 is formed in the housing 1 and extends between the inner surface 3 and the outer surface 2 to define a hot air outlet from the food preparation chamber 3 to outside the apparatus. The vent 20 is disposed at the upper part 17 of the food preparation chamber 4 proximate to the fan 14. The vent 20 and fan 14 are positioned in the upper part of the food preparation chamber 3 to help prevent liquid discharged from the food items from collecting on the fan 14 and being discharged through the vent 20. In the present embodiment, the fan 14 is a radial fan and the vent 20 is formed in the housing 1 on a line extending in a radial direction to the axis of rotation of the fan 14. However, it will be appreciated that alternative means of circulating air in the food preparation chamber 4 are envisaged.

The vent 20 has an elongate opening 22 which extends along a rear side 23 of the housing inner surface 3 parallel to a base 34 of the housing 1 and communicates the food preparation chamber 4 with the vent 20. Similarly, an elongate exit 24 to the vent 20 extends along a rear side 25 of the housing outer surface 2 and communicates the vent 20 with outside the housing 1. The vent 20 has upper and lower faces 26, 27 which oppose each other, and opposing side faces 28.

Figure 3:
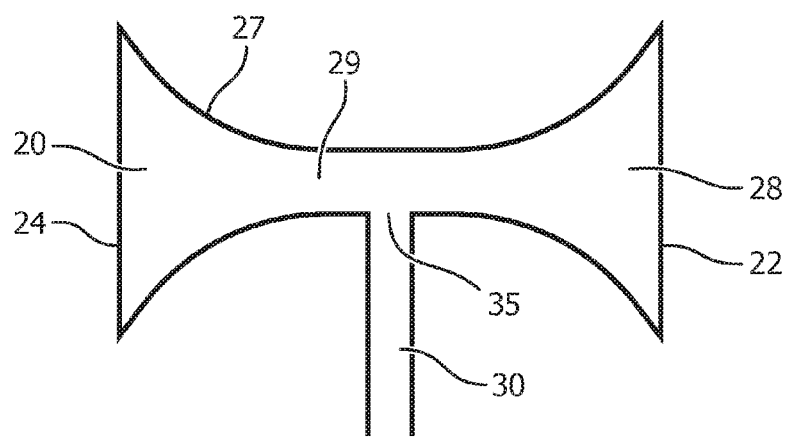
FIG. 3 shows an exploded view of an exemplary cross-sectional view of a hot air vent in accordance with the principles of the invention.

The upper and lower faces 26, 27 of the vent 20 converge towards each other from the opening 22 such that the cross-sectional area of the vent 20 is reduced extending into the vent 20. Therefore, the vent 20 has a constricted section 29 wherein the cross-sectional area of the vent 20 is smaller than the cross-sectional area of the vent 20 at the opening 22. The upper and lower faces 26, 27 are arcuate, although it will be understood that the arrangement is not limited thereto. (See FIG. 3).

The constricted section 29 of the hot air vent 20 generates a venturi effect in the hot air vent 20 as air flows along the vent 20, through the constricted section 29. The upper and lower faces 26, 27 of the vent 20 then diverge away from each other towards the exit 24 of the vent 20 from the constricted section 29, such that the cross-sectional area of the vent 20 at the exit 24 is larger than the cross-sectional area of the vent 20 in the constricted section 29.

Although in the present embodiment the upper and lower faces 26, 27 of the vent 20 converge towards each other to form the constricted section 29, it will be appreciated that the arrangement of the vent 20 is not limited thereto and that other arrangements are possible to form the restricted section 25 in which the cross-sectional area of the vent 20 is reduced away from the opening 22 to the vent 20. In another embodiment, one of the upper or lower faces 26, 27 of the vent 20 extends parallel to the base of the housing and the opposing face 26, 27 converges towards the planar face 26, 27 to form the constricted section 25. Alternatively, or as well as, one or both of the side walls 25 of the vent 20 converges towards the opposing side wall 25 to form the constricted section 25 of the vent 20. In yet another embodiment, the vent may have an arcuate face, and a section of this arcuate face converges towards a diametrically opposing section of the arcuate face.

Figure 4:
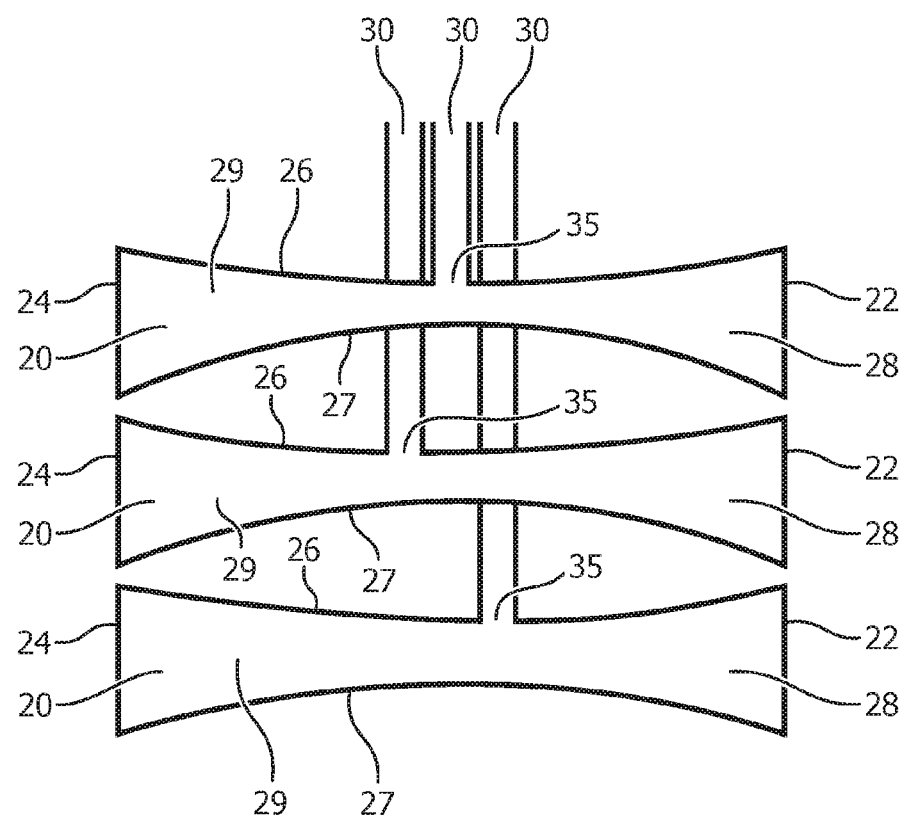
FIG. 4 shows an exploded view of a second exemplary cross-sectional view of a hot air vent in accordance with the principles of the invention.

Although in the present embodiment the vent 20 has a single hot air channel, it will be appreciated that in an alternative embodiment the vent has a plurality of hot air channels extending from the food preparation chamber to outside the housing. For example, in an alternative embodiment the hot air vent has a plurality of adjacent channels (see FIG. 4), each with converging upper and lower walls. Alternatively, the vent has a plurality of adjacent channels formed by upstanding columns disposed in the vent (see FIG. 4), wherein each of the upstanding columns has sidewalls which converge towards an opposing side wall to form constrictions in the vent.

A cooling air channel 30 is formed in the housing 1 through which cooling air is drawn to cool the housing 1 and other components disposed in the housing 1. The cooling air channel 30 includes one or cooling air passageways 32a, 32b formed in the housing 1 which are in fluid communication with each other. The cooling air channel 30 has a cooling air inlet 33 in the base 34 of the housing 1 so that air can flow into the cooling air channel 30 from outside the housing 1.

The cooling air channel 30 has an outlet 35 which communicates with the constricted section 29 of hot air vent 20. The outlet 35 is formed by an aperture in the upper face 26 of the hot air vent 20. The outlet 35 is formed midway along the constricted section 29 of the hot air vent 20, so that a reduced static pressure is generated at the outlet 35 due to the venturi effect generated as air flows through the hot air vent 20.

Although in the present embodiment the outlet 35 to the cooling air channel is formed in the upper face 26 of the hot air vent 20, it will be appreciated that the outlet 35 may be disposed to communicate with any part of the constricted section 29 of the hot air vent 20.

The housing 1 further comprises a component chamber 37. The component chamber 37 is disposed in an upper part of the housing 1, and the motor 15 for driving the fan 14 is disposed in the component chamber 37 along with other components (not shown). The component chamber 37 communicates with the cooling air channel 30 so that cooling air flows through the component chamber 37 when cooling air flows along the cooling air channel 30.

The food preparation chamber 4 is arranged in two parts, an upper part 4a and a lower part 4b. The lower part 4b is releasable from the upper part 4a so that it is removable from the upper part 4a to enable access to the food preparation chamber 4. The lower part 4b comprises a lower section of the housing 1 and the inner wall 5, including the air permeable section 10 of the inner wall 5, and a handle 38 to aid the removal of the lower part 4b from the upper part 4a. Therefore, the lower part 4b forms a basket or basin shaped arrangement, with an upper opening, so that food items may be placed in or removed from the food receiving space 6.

A control panel 39 is mounted to the housing to enable the operation of the apparatus to be controlled, for example the time of operation and the temperature in the food preparation chamber 4.

Operation of the apparatus for preparing food will now be described with reference to FIG. 1.

A user initially removes the lower part 4b of the food preparation chamber 3 from the housing 1 by manoeuvring the handle 38 so that the lower part 4b separates from the upper part 4a and allows the user to access the food receiving space 6. The user then places the food items to be heated and/or cooked into the food receiving space 6, placing them on the air permeable section 10. This positioning of the food items on the air permeable section 10 allows hot air to be blown past the food to improve heating of the food due to the hot air flow, and allows liquid from the food, for example water and oil to fall through the air permeable section 10 from the food receiving space 6.

The upper and lower parts 3a, 3b of the food preparation chamber 3 are then reconnected so that they lie flush with each other. The user is then able to operate the apparatus by means of the control panel 39. When the apparatus is operated, the heater 16 is operated to emit heat and the fan 14 is operated to circulate a flow of air in the food preparation chamber 4.

When the heater 16 is operated, it heats the food in two different manners, by radiating heat to heat the food items directly in the food receiving chamber 4, and by heating the air flowing past it by use of the fan 14 which circulates hot air to heat the food items.

The fan 14 draws hot air heated by the heater 16 through the air discharge aperture 13 by generation of a low pressure proximate thereto. The hot air is then drawn through the fan 14 and is expelled at a high pressure from the fan 14 into the air guide passage 7 defined between the inner surface 3 of the housing and the inner wall 5. The air guide passage 7 guides the flow of hot air towards the lower part 4b of the food preparation chamber 4. The flow of hot air then flows successively through the air permeable section 10, food receiving space 6 and the discharge aperture 13.

When the flow of air moves through the food receiving space 6 it flows over the food items disposed therein and acts to heat the food items. It will be appreciated that the flow of air over food items includes each of the flow of air past, through and/or around food items. Water and fat are discharged from the food items and enter the air flow to form steam and oil particles. The air then flows past the heater 16 to raise the temperature of the air again, and is drawn back towards the fan 14. Thereinafter, the air circulates in the food preparation chamber 4. The pressure in the food preparation chamber 4 increases as steam is generated by the evaporation of water discharged from the food items.

As the hot air is expelled by the fan 14, a portion of the flow of air at a raised pressure is expelled towards the hot air vent 20 extending between the food preparation chamber 4 and outside the housing 1. This hot air is therefore urged to flow into the hot air vent 20 to be expelled through the vent 20 to outside the housing. The cross-sectional area of the vent 20 decreases along the flow path formed by the vent 20 from the vent opening 22 to the constricted section 29 such that a venturi effect is generated in the vent 20. The velocity of the air increases as the cross-sectional area of the vent 20 decreases towards the constricted section 29. Therefore, the static pressure correspondingly decreases and a reduced static pressure is formed in the constricted section 29.

The reduced static pressure in the constricted section 29 means that a low static pressure is formed at the outlet 35 to the cooling air channel 30. Therefore, cooling air in the cooling air channel 30 is drawn from the cooling air channel 30 through the outlet 35 and into the flow path of the hot air vent 20.

An air flow is then produced in the cooling air channel 30 as air is drawn along the cooling air channel 30 to the cooling air outlet 35 due to the reduced static pressure at the outlet 35, and fresh cooling air is drawn into the cooling air channel 30 through the inlet 33 to the cooling air channel 30. The fresh air drawn in through the inlet 33 is at an atmospheric temperature and so will act to remove heat from the housing 1 and so reduce the temperature of the housing 1.

The combined hot air expelled from the food preparation chamber 4 and the cooling air drawn through the outlet 35 of the cooling air channel 30 into the vent 20 is then exhausted through the vent exit 24 out of the housing 1. As the combined air flows through the vent 20 from the constricted section 29 to the vent exit 24, the cross-sectional area of the flow path in the vent 20 is increased as the opposing faces diverge from each other. Therefore, the velocity of the fluid decreases towards the vent exit 24. As a result, the velocity of the combined air flowing from the housing 1 is minimized.

It will be appreciated that the combined air flow will be at a lower temperature than that of the hot air and other fluids expelled from the food preparation chamber only, and so the likelihood of injury or damage being caused by the fluid exhausted through the hot air vent 20 is minimized.

Furthermore, an advantage of the above arrangement is that cooling air is drawn through the cooling air channel 30 and exhausted from the housing 1 without the need for an additional fan or other components to create a flow. Therefore, the reliability of the cooling system is improved over conventional apparatus due to the absence of moving parts or components in the cooling system. In addition, the level of noise generated by the apparatus is minimized.

Cooling air is also drawn through the component chamber 37 which is in fluid communication with the cooling air channel 30. Therefore, the air flowing through the component chamber 37 will carry heat away from the components disposed therein and so the reliability of these components will be increased.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived there from. It is noted that the invention relates to all possible combinations of features recited in the claims.

The invention claimed is:

1. An apparatus for preparing food comprising:
 a housing;
 a food preparation chamber, in the housing, comprising:
  an inner wall defining a food receiving space with an air entry aperture and an air discharge aperture;
  a fan configured to move a flow of hot air successively through the air entry aperture, the food receiving space and the air discharge aperture, and
  an air guide passage for returning the flow of air from the air discharge aperture towards the air entry aperture separate from the food receiving space, wherein the housing comprising:
 a cooling air channel; and
 a hot air vent configured to exhaust hot air from the food preparation chamber outside the housing, said hot air vent comprising:
  an opening accessible from the food preparation chamber;
  an exit accessible from the outside the housing; and
  a constricted section, between and the opening and the exit, having a reduced cross-sectional area; wherein the constricted section comprises:
   an outlet to the cooling air channel, wherein a region of low pressure is formed at the outlet and a flow of cooling air is drawn along the cooling air channel into the hot air vent.

2. The apparatus according to claim 1, wherein the cross-sectional area of the hot air vent reduces from the opening to the constricted section.

3. The apparatus according to claim 1, wherein:
 the exit on is on an opposing side of the constricted section.

4. The apparatus according to claim 3, wherein the cross-sectional area of the hot air vent increases from the constricted section to the exit.

5. The apparatus according to claim 1, wherein the hot air vent comprises a wall which converges inwardly towards an opposing wall to form the constricted section.

6. The apparatus according to claim 5, wherein the wall and the opposing wall converge towards each other to form the constricted section.

7. The apparatus according to claim 5, wherein the wall is in one of: and upper wall and a lower wall.

8. The apparatus according to claim 5, wherein the wall is arcuate and at least a section of the wall converges towards the opposite wall.

9. The apparatus according to claim 1, wherein the cooling air channel comprises an inlet spaced from the outlet which communicates outside the housing so that cooling air is drawn into the cooling air channel when cooling air is drawn along the cooling air channel and into the hot air vent.

10. The apparatus according to claim 9, wherein the inlet is formed in a base of the housing.

11. The apparatus according to claim 1, further comprising:
 a component chamber, wherein the cooling air channel fluidly communicates with the component chamber so that cooling air is drawn through the component chamber to cool components disposed therein.

12. The apparatus according to claim 3, wherein the exit comprises:
 a plurality of hot air channels communicating between the food preparation chamber and outside the housing, wherein each channel comprises a constricted section.

13. The apparatus according to claim 1, further comprising a cooling air channel associated with each of the plurality of cooling channels.

14. The apparatus according to claim 1, wherein a part of the food preparation chamber is removable from a front side of the housing; and
 the hot air vent is formed in a rear side of the housing opposite the front side.

* * * * *